(12) United States Patent
Green et al.

(10) Patent No.: US 6,446,003 B1
(45) Date of Patent: Sep. 3, 2002

(54) METHOD FOR DETERMINING DRIFT WITH A DIGITAL COMPASS

(75) Inventors: James C. Green, Los Altos Hills, CA (US); Richard Williams, Christ Church (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/670,497

(22) Filed: Sep. 26, 2000

Related U.S. Application Data

(63) Continuation-in-part of application No. 09/614,392, filed on Jul. 12, 2000, now Pat. No. 6,353,798.

(51) Int. Cl.⁷ .............................................. G01C 21/02
(52) U.S. Cl. .................. 701/213; 701/216; 342/357.14
(58) Field of Search ................... 701/213, 214, 701/216, 224, 11; 342/357.08, 357.14; 244/175, 194, 195

(56) References Cited

U.S. PATENT DOCUMENTS

| | | | | |
|---|---|---|---|---|
| 5,339,246 A | * | 8/1994 | Kao ........................... | 364/457 |
| 5,369,589 A | | 11/1994 | Steiner ....................... | 364/449 |
| 5,491,636 A | * | 2/1996 | Robertson et al. .......... | 364/432 |
| 5,572,217 A | * | 11/1996 | Flawn ......................... | 342/357 |
| 5,790,477 A | * | 8/1998 | Hauke ......................... | 368/10 |
| 5,983,145 A | * | 11/1999 | Becker ........................ | 701/21 |

\* cited by examiner

*Primary Examiner*—Michael J. Zanelli
(74) *Attorney, Agent, or Firm*—Wagner Murabito & Hao LLP

(57) ABSTRACT

An integrated position and direction system and method thereof for determining drift. The integrated position and direction system comprises a satellite positioning system and a digital compass. The satellite positioning system is used for determining position and heading, and the digital compass is used for determining direction. An amount of drift can be determined using the heading and the direction. Knowing the amount of drift, a course compensating for the drift can be determined. Thus, a craft that has drifted from its planned course can be directed to a course that will allow it to reach its intended destination.

16 Claims, 20 Drawing Sheets

METHOD FOR DETERMINING DRIFT WITH A DIGITAL COMPASS

CROSS REFERENCE TO RELATED APPLICATION

This Application is a Continuation-in-Part of commonly-owned U.S. patent application Ser. No. 09/614,392, filed Jul. 12, 2000, now U.S. Pat. No. 6,353,798, by J. Green et al., and entitled "Integrated Position and Direction System with Three-Sensor Digital Compass."

TECHNICAL FIELD

This invention relates to position determination systems, in particular an apparatus for determining direction and heading. Specifically, the present invention pertains to a method for using such an apparatus to determine the amount of drift based on direction and heading measurements.

BACKGROUND ART

Satellite positioning system (SATPOS) devices that determine position using the satellites of the US Global Positioning System (GPS) are commonly Used for navigation of vessels, vehicles, airplanes, and other such crafts and conveyances. SATPOS devices are also used for surveying, construction site planning and management, mining, oil and gas exploration and development, etc. Also, handheld SATPOS devices are used for personal navigation, data collection, data maintenance, etc.

SATPOS devices are quite effective for indicating the position of the SATPOS device. Position is typically indicated using either an alphanumeric indication of position or by displaying a map that indicates position. Alphanumeric indications of position typically include coordinates such as, for example, latitude and longitude, World Geodetic Survey (WGS) coordinates, etc.

Map displays typically indicate position by an icon or other indicator visible on a map. One such map display, typically referred to as a moving map display, displays the position of the SATPOS in the center of the displayed map. Such map displays typically are oriented such that the top of the SATPOS device's display indicates North (either magnetic North or true North). That is, irrespective of the direction in which the SATPOS device is actually oriented, North is shown at the top of the display. For users that intuitively know which direction is North, such maps are adequate for locating features displayed on the map. However, for users that do not know where North is, or when visibility is obscured such that the user cannot determine where North is, such maps are inadequate for guiding the user to a destination or feature on the map.

For many commercial applications of SATPOS systems, such as construction site planning and management, surveying, navigation, etc., it is essential that an operator be able to locate features displayed on the map. Such users typically operate a separate device for indicating direction such as a conventional magnetic compass.

Some SATPOS devices indicate the direction of movement of the SATPOS device, typically referred to as "heading." Typically, heading is determined by analysis of determined position in relation to prior determinations of position as the SATPOS moves. Typically, SATPOS devices that indicate heading use a map display oriented such that the top of the SATPOS unit (e.g., the top of the unit's display) corresponds to North (either magnetic North or true North). Some prior art SATPOS devices orient the displayed map such that the top of the SATPOS unit (e.g., the top of the unit's display) corresponds to the direction of movement calculated by the SATPOS device. This gives a good approximation of the user's heading as long as the user continues to move and as long as the SATPOS unit is oriented in the direction of movement, allowing a user to easily determine the location of features visible on the display.

However, when the SATPOS device stops moving, determination of heading can no longer be made. Some SATPOS systems maintain the previous heading for orienting the moving map display for a given time interval. Other prior art SATPOS systems default to positioning North at the top of the map. This can be quite confusing to the user.

Recently, digital compasses have been developed that can indicate direction. However, digital compasses must be calibrated to properly align the digital compass prior to use. Also, each time that magnetic environment around the compass changes, the digital compass must be recalibrated. Digital compasses are typically calibrated by moving the digital compass in a full horizontal arc. The calibration process takes time and is prone to operator error. Also, calibration error can occur as a result local magnetic anomalies.

What is needed is a method and apparatus for providing an accurate indication of heading to a user of a SATPOS device. Also, a method and apparatus are needed that meet the above need and that accurately indicate direction when the SATPOS is not moving. Also, a method and apparatus are needed that are easy to use and that do not require a user to manually calibrate a compass.

As described above, a SATPOS device can be used for navigation of vessels, vehicles, airplanes, and other such crafts and conveyances. The SATPOS device can be used to determine the position of the craft and an approximation of the craft's heading. A digital compass can be used to determine the craft's direction.

However, a problem with navigating the craft occurs when the craft is caused to drift from its planned course. For example, consider a boat attempting to travel due North across a body of water. The boat's driver will keep the bow of the boat pointing North according to the digital compass. However, the boat will be subject to tides, currents and winds that cause it to drift sideways from its intended course, even though the bow is still pointed North. The driver will believe he or she is proceeding due North, when in actuality the boat will also be drifting some amount to the East or West. Consequently, it is likely that the intended destination will be missed, even though the driver thinks he or she is on course.

The driver may use a SATPOS device to determine position and heading. However, as described above, some SATPOS devices indicate heading using a map display that is oriented such that the top of the SATPOS device corresponds to North, while other SATPOS devices orient the displayed map such that the top of the SATPOS device corresponds to the direction of movement calculated by the device. In the example above, the boat's driver believes he or she is heading one direction (e.g., due North) when the boat's drift is actually carrying the boat in a different direction. Thus, the SATPOS device may not be properly oriented, or the heading information may be misleading or confusing.

Furthermore, though the factors that cause drift (e.g., wind, current, etc.) are generally always present, the amount of drift that these factors can induce can vary significantly with time and location. For example, the velocity and direction of the wind velocity can change significantly with time, and currents can vary with location. Therefore, the magnitude and direction of drift will not be constant. As a result, multiple course corrections will be required. Each time, the driver or pilot must obtain position and heading information, compare it to the planned course and heading, and calculate the amount of drift. These tasks may be difficult and burdensome for a boater or pilot. In addition, these tasks may need to be performed frequently under those circumstances (e.g., high winds, strong currents, etc.) that can cause the craft to drift far off course unless frequent course corrections are made.

Accordingly, what is also needed is a method and/or system that can be used for accurate navigation accounting for factors such as drift. What is also needed is a method and/or system that accomplishes the above need and is also convenient and user-friendly. The present invention meets this need and the above needs.

DISCLOSURE OF THE INVENTION

The present invention provides a method and apparatus that accurately indicate direction and heading to a user of a satellite positioning system (SATPOS) device. The present invention also provides a method and system for determining an amount of drift based on the direction and heading information. The present invention is also user-friendly and convenient.

An integrated position and direction system is disclosed that includes a SATPOS having a receiver adapted to receive satellite position determining signals. The integrated position and direction system of the present invention also includes a digital compass that is adapted to determine direction.

The integrated position and direction system also includes a controller for controlling the operations of the integrated position and direction system. The controller is coupled to the SATPOS, the digital compass, and to a display.

In one embodiment of the present invention, when the SATPOS is moving, the direction of movement or "heading" determined by the SATPOS is indicated on the display. When the SATPOS is not moving, the direction given by the digital compass is indicated on the display. Therefore, while the SATPOS is moving, the heading is indicated, and when the SATPOS is not moving, direction is indicated using the digital compass. Thus, the present invention provides a method and apparatus for providing an accurate indication of both heading and direction to a user of a SATPOS device.

In one embodiment, the digital compass is automatically calibrated by the SATPOS when the SATPOS is moving. This calibration can be initiated by the user or can be fully automatic. More particularly, the digital compass of the present invention is calibrated automatically, either as a result of user input (e.g., selection of an icon, pressing of a button, etc.), or as a result of user-defined criteria for automatic calibration. That is, the user can program the present invention to automatically calibrate the digital compass (e.g., when velocity exceeds a given threshold, whenever the SATPOS begins moving, periodically while the SATPOS is moving, when the difference between the SATPOS determined heading differs from the heading indicated by the digital compass by more than a predetermined threshold, etc.). Thus, the position and direction system of the present invention is easy to use because there in no need for a user to calibrate a compass as is required using a prior art compass alone.

In another embodiment, a method and system for determining drift using an integrated position and direction system are disclosed. The satellite positioning system is used for determining position and heading, and the digital compass is used for determining direction. An amount of drift is determined using the heading and the direction. The amount of drift can be displayed to a user along with the position, heading and direction information.

Knowing the amount of drift, a course compensating for the drift can be determined. Thus, a craft (e.g., a boat, airplane, etc.) that has drifted from its planned course can be directed to a course that will allow it to reach its intended destination. In one embodiment, the integrated position and direction system can be coupled to a navigation control system for the craft.

In accordance with the present embodiment of the present invention, frequent (relatively continuous) measurements of the amount of drift (magnitude and direction) can be provided to a user. As such, the user (e.g., a driver of a boat, a plane's pilot or auto pilot, etc.) can make multiple, relatively minor adjustments along the way to compensate for the drift. Thus, in accordance with the present invention, the craft will follow a more direct course to its intended destination, and thereby will reach its destination more quickly and efficiently.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
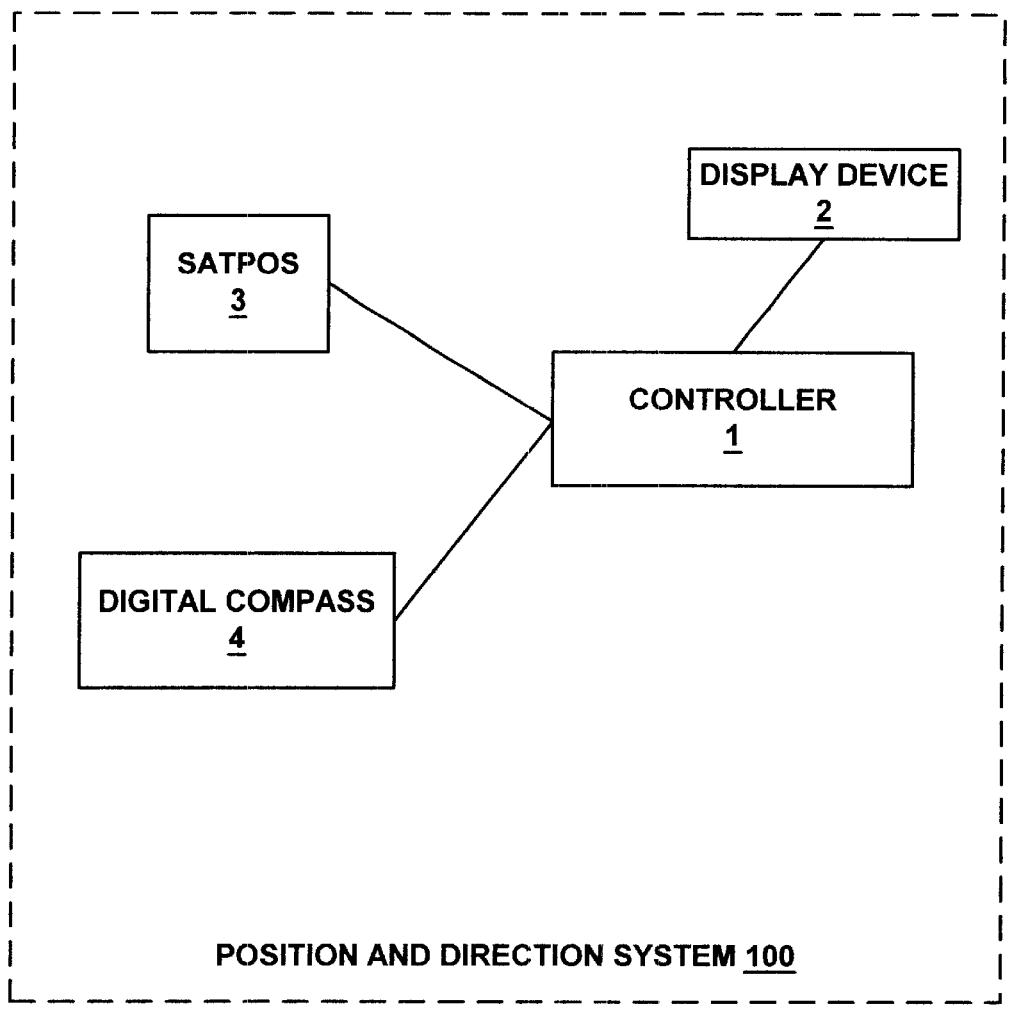
FIG. 1 is a diagram of a position and direction system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Notation and Nomencalture

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking" or "recording" or "generating" or "determining" or "correlating" or "predicting" or "using" or "updating" or "identifying" or "receiving" or the like, refer to the action and processes of a computer system (e.g., process 1600 of FIG. 16), or similar electronic computing device, that manipulates and transforms data represented as physical (electronic) quantities within the computer system's registers and memories into other data similarly represented as physical quantities within the computer system memories or registers or other such information storage, transmission or display devices.

Integrated Position and Direction System

FIG. 1 is a logical representation of components of integrated position and direction system 100 in accordance with one embodiment of the present invention. Integrated position and direction system 100 includes Satellite Positioning System (SATPOS) 3 that is operable for determining position. In one embodiment, SATPOS 3 is adapted to determine position using a Satellite Positioning System such as the US Global Positioning System (GPS).

In operation, SATPOS 3 determines the location of SATPOS 3 by analysis of satellite position determining signals such as signals from satellites of the US GPS. Position signal processing circuitry in SATPOS 3 also determines the direction of movement of SATPOS 3, referred to hereinafter as "heading" and couples the determined heading to controller 1. In the present embodiment, heading is determined by comparing satellite position determining signals received as the integrated position and direction system 100 moves.

Integrated position and direction system 100 of FIG. 1 also includes digital compass 4. Digital compass 4 is operable to determine direction and couple direction to controller 1. More particularly, in the present embodiment, digital compass 4 determines the compass direction that corresponds to the orientation of the integrated position and direction system 100.

Continuing with FIG. 1, controller 1 controls the operation of integrated position and direction system 100. In one embodiment, controller 1 is a general-purpose computer. Alternatively, controller 1 is an integrated circuit device such as a microcontroller or an Application Specific Integrated Circuit (ASIC) device or a Field Programmable Gate Array (FPGA) device. In one embodiment, the functions of controller 1 are performed by a general purpose microprocessor that is operable to execute instructions contained in one or more software program(s).

In the present embodiment, controller 1 is operable to display the determined position and the determined direction and/or heading on display 2. Display device 2 may be a liquid crystal device, flat panel display, or other display device suitable for creating graphic images and alphanumeric characters recognizable to the user.

Figure 2:
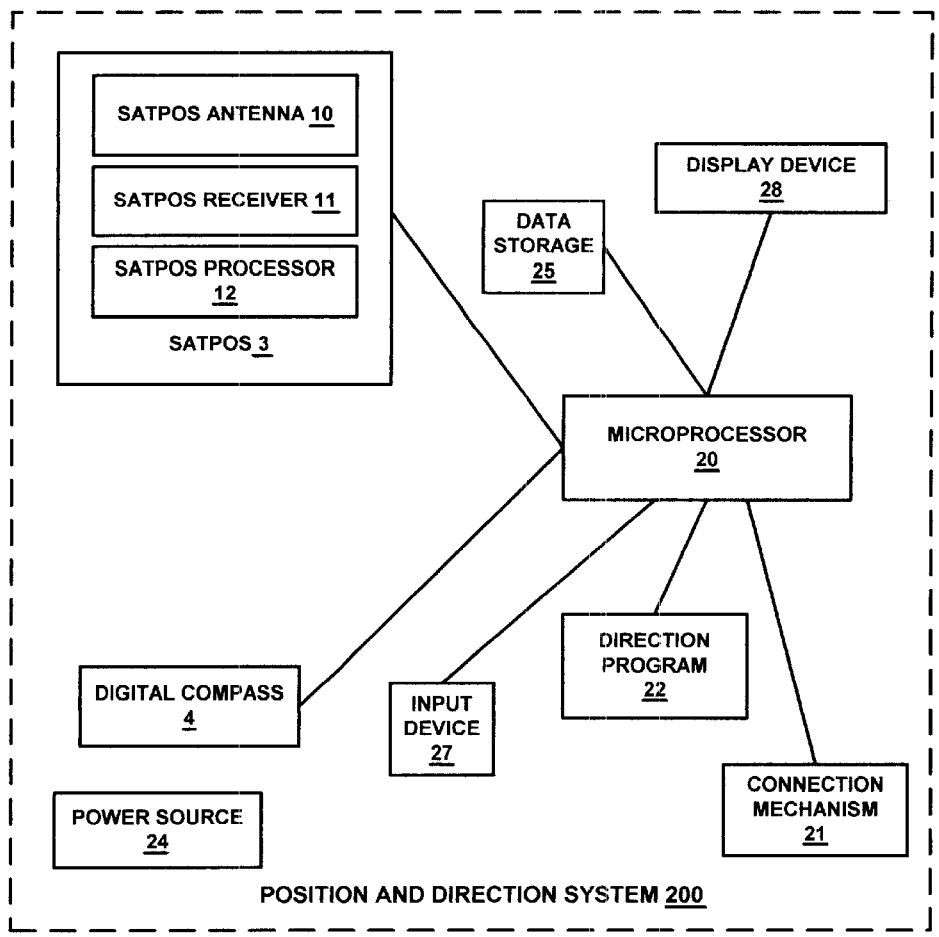
FIG. 2 is a diagram of an embodiment of the position and direction system of FIG. 1 in accordance with one embodiment of the present invention.
Figure 3:
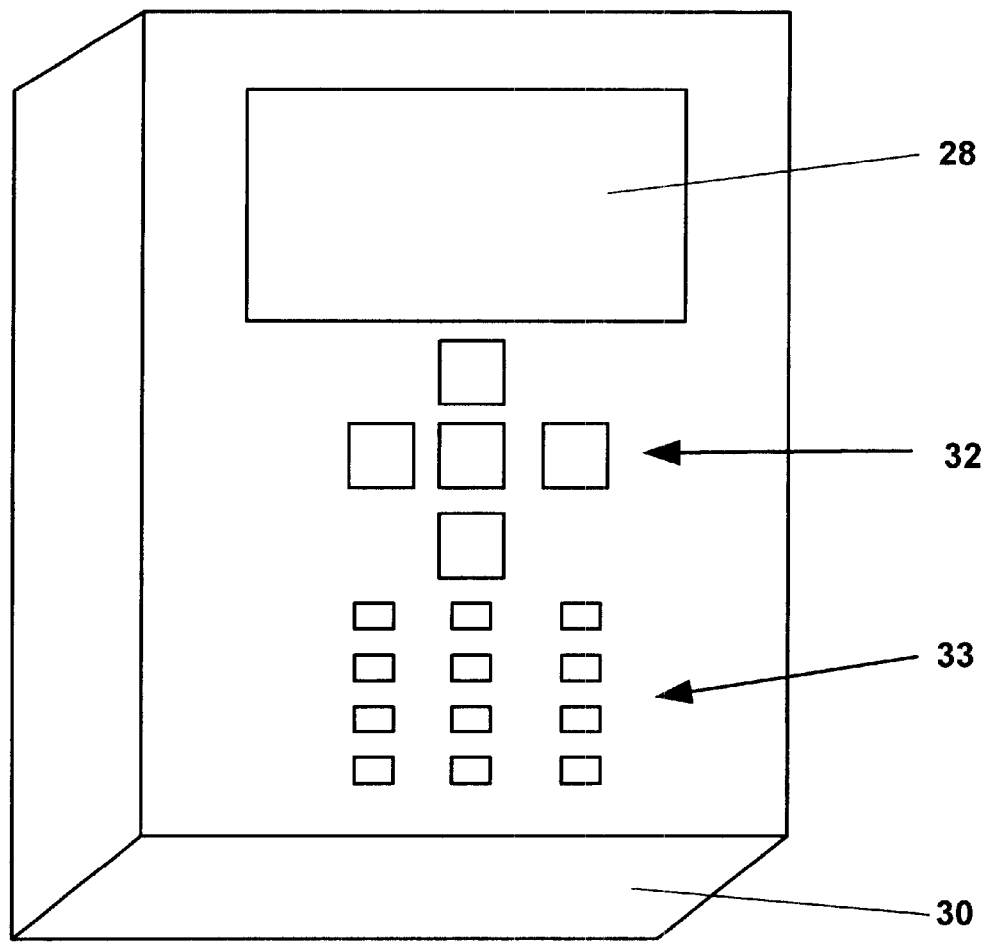
FIG. 3 is a perspective view of an embodiment of the position and direction system of FIG. 2 in accordance with one embodiment of the present invention.

FIGS. 2–3 show an embodiment of the present invention that is incorporated into a handheld portable housing. That is, the housing is small enough to fit into a user's hand.

Referring now to FIG. 2, integrated position and direction system 200 is shown to include SATPOS 3 that is operable for determining position. In the present embodiment, SATPOS 3 includes SATPOS antenna 10, SATPOS receiver 11, and SATPOS processor 12. In one embodiment, SATPOS processor 12 is a GPS processor made by Trimble Navigation, Ltd., of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

Referring still to FIG. 2, microprocessor 20, in conjunction with direction program 22, performs the functions of controller 1 of FIG. 1. That is, in the present embodiment, direction program 22, operable on microprocessor 20, controls the operations of integrated position and direction system 200. In the present embodiment, microprocessor 20 is a general-purpose microprocessor that has low power consumption such as, for example, a Motorola RISC (reduced instruction set computer) microprocessor made by Motorola Inc. of Austin, Tex. Alternatively, another type of processor, an ASIC device or a FPGA device can be used.

Continuing with FIG. 2, power source 24 provides power to the various components of integrated position and direction system 200. Power source 24 may be any suitable power source that is light-weight and compact such as, for example, built-in rechargeable batteries, size AA batteries or size AAA batteries.

Data storage device 25 is coupled to controller 20 and is adapted to store data. Data that can be stored in data storage device 25 include, for example, an operating software program such as direction program 22. Data storage device 25 can also be used to store data collected by SATPOS 3. Data storage device 25 may be any type of digital data storage medium. In one embodiment, data storage device 25 is a Random Access Memory (RAM) device such as, for example, a Static Random Access Memory (SRAM) device, a Dynamic Random Access Memory (DRAM) device. Alternatively, other types of memory storage devices such as flash memory, tape, CD ROM, or DVD may be used.

Referring still to FIG. 2, connection mechanism 21 is coupled to microprocessor 20 and is adapted to connect to external devices such as, for example external computers. This allows for easily and quickly downloading new programs for operation on microprocessor 20 and allows for updating direction program 22. Connection mechanism 21 also allows data to be downloaded from SATPOS 3 to an external computer system. In one embodiment, connection mechanism 21 is a connector that complies with the RS-232 standard.

With reference again to FIG. 2, display device 28 is also electrically coupled to microprocessor 20. In one embodiment, display device 20 is an active matrix liquid crystal display. Alternatively a cathode ray tube, or other display device suitable for creating graphic images and alphanumeric characters recognizable to the user can be used.

Input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

Referring now to FIG. 3, an embodiment of position and direction system 200 is shown that is incorporated into housing 30 that is small enough to hold in a user's hand. In the present embodiment, function keys 32 and alphanumeric keypad 33 allow for coupling user input to position and direction system 200. In one embodiment, one or more of function keys 32 operates as a cursor control device. That is, one or more of function keys 32 allows the computer user to dynamically signal the two-dimensional movement of a visible symbol (cursor) on the display screen of display device 28.

Figure 4:
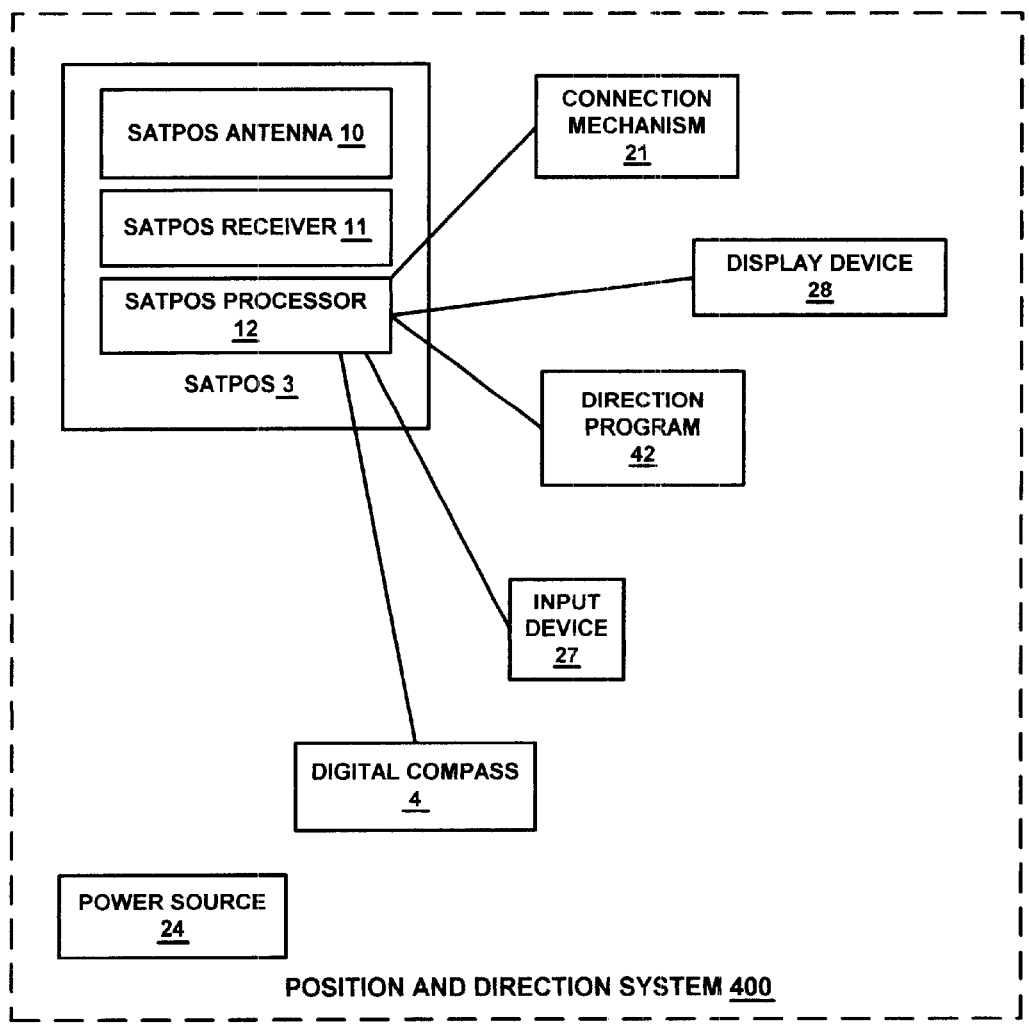
FIG. 4 is a diagram of a position and direction system in accordance with one embodiment of the present invention.

FIG. 4 shows an embodiment of the present invention in which SATPOS processor 12 is used for controlling the operations of the integrated position and direction system 400. Because SATPOS processor 12 is used for controlling the operations of integrated position and direction system 400, there is no need for a second microprocessor such as microprocessor 20 of FIG. 2.

In the embodiment shown in FIG. 4, SATPOS processor 12 is operable to determine position and heading using SATPOS signals and is also operable to receive direction determined by digital compass 4. In this embodiment, SATPOS processor 12 includes instructions for determining which source of direction signals (heading from SATPOS signals or direction determined by digital compass 4) is to be indicated (e.g., displayed) on display device 28. In the present embodiment, these instructions are contained in direction program 42 that controls the operations of integrated position and direction system 400. Direction program 42 is a computer program that is operable on SATPOS processor 12. However, alternatively, instructions necessary for the operation of integrated position and direction system 400 can be implemented on an ASIC, a FPGA, or similar device.

In the present embodiment, position is indicated on display device 28. In one embodiment, position is indicated alphanumerically using latitude and longitude. Alternatively, position is indicated by an icon displayed on a moving map display.

In the present embodiment, reference to a satellite position determination system, or "SATPOS" herein, refers to a Global Positioning System (GPS), to a Global Orbiting Satellite System (GLONASS), and to any other positioning system, including pseudolites, that provide signals that can be used to determine position. The terms "satellite position determination system" and "SATPOS," as used herein, are intended to include position determination using pseudolites or equivalents of pseudolites, and the terms "satellite position determination system signals" and "SATPOS signals," as used herein, are intended to include position determination system-like signals and data from pseudolites or equivalents of pseudolites. Also, signals from other sources such as LORAN, Wide Area Augmentation System (WAAS) satellites, etc., may be used to determine position.

In the embodiments shown in FIGS. 1–4, digital compass 4 is used to determine direction. In the present embodiment, digital compass 4 is a compass that determines direction by detection of electromagnetic flux. In the present embodiment, digital compass 4 is a magnetic field sensor made by Honeywell, Inc. Any of a number of different types of commercially available digital compasses can be used.

Figure 11:
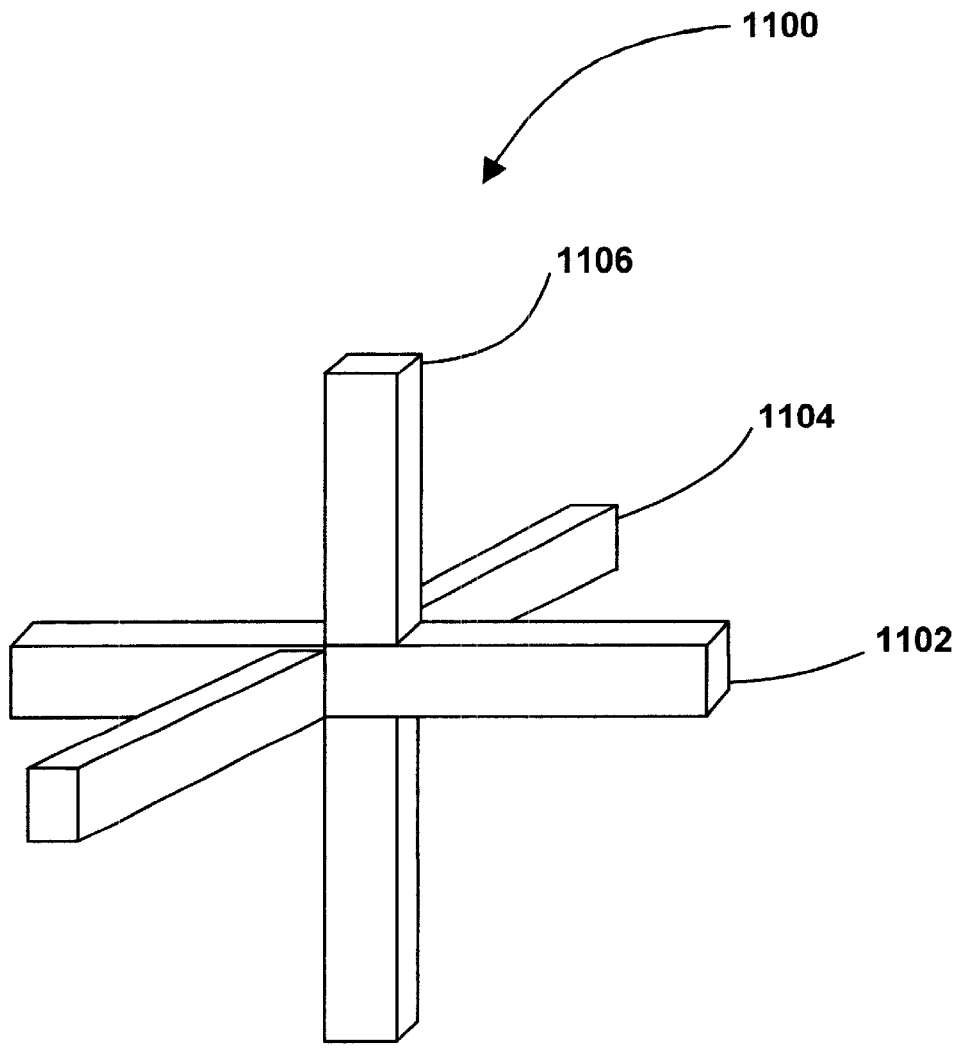
FIG. 11 is a schematic representation of an exemplary configuration for a 3-Sensor magnetic sensor in accordance with one embodiment of the present invention.

Referring now to FIG. 11, a schematic representation of a magnetic field sensor 1100 in accordance with one embodiment of the present invention is shown. In this embodiment, magnetic field sensor 1100 is comprised, in part, of three sensors 1102, 1104, and 1106. By having three sensors, magnetic field sensor 1100 is able to determine the elevation angle of integrated position and direction system 100 of FIG. 1. More specifically, in one embodiment, sensors 1102 (x-direction sensor) and 1104 (y-direction sensor) determine the azimuthal orientation of integrated position and direction system 100. However, the determination of azimuthal orientation will determined with the assumption that integrated position and direction system 100 is held level. Thus, if, for example, a user of integrated position and direction system 100 is walking up a steep hill, walking down a steep hill, holding the integrated position and direction system 100 in a vertically oriented manner, and the like, the accuracy of the determined azimuthal orientation may be severely compromised. By using magnetic field sensor 1100 which includes sensor 1106 (z-direction sensor), the present embodiment is able to correctly determine the azimuthal orientation of integrated position and direction system 100 by correcting for any variation from horizontal in the position of integrated position and direction system 100. That is, sensor 1106 of the present embodiment determines the variance in integrated position and direction system 100 from a truly horizontal position. It will be understood that in the representation of FIG. 11, when integrated position and direction system 100 is at a truly horizontal position, sensor 1106 will be vertically oriented. Although a specific schematic implementation is shown in FIG. 11, the present invention is well suited to use with any of a number of different types of commercially available digital compasses which compensate for variations from a horizontal orientation.

Referring still to FIG. 11, in one embodiment, in addition to correcting the determined azimuthal orientation of integrated position and direction system 100 for variance from a truly horizontal orientation, the present invention also determines (and optionally displays) the elevation angle of integrated position and direction system 100. In such an embodiment, the user is made aware not only of the accurate azimuthal orientation (i.e. the direction in which integrated position and direction system 100 is pointed), but the user is also informed of the elevation angle at which integrated position and direction system 100 is oriented. Hence, the user can determine, for example, the slope of a hill by holding integrated position and direction system 100 parallel to the surface of the hill and reading the determined elevation angle. Additionally, although magnetic field sensor 1100 is comprised, in part, of three orthogonally oriented sensors 1102, 1104, and 1106 in the present embodiment, the present invention is also well suited to an embodiment in which more than three sensors are used and to an embodiment in which the plurality of sensors are arranged other than orthogonally.

Figure 5:
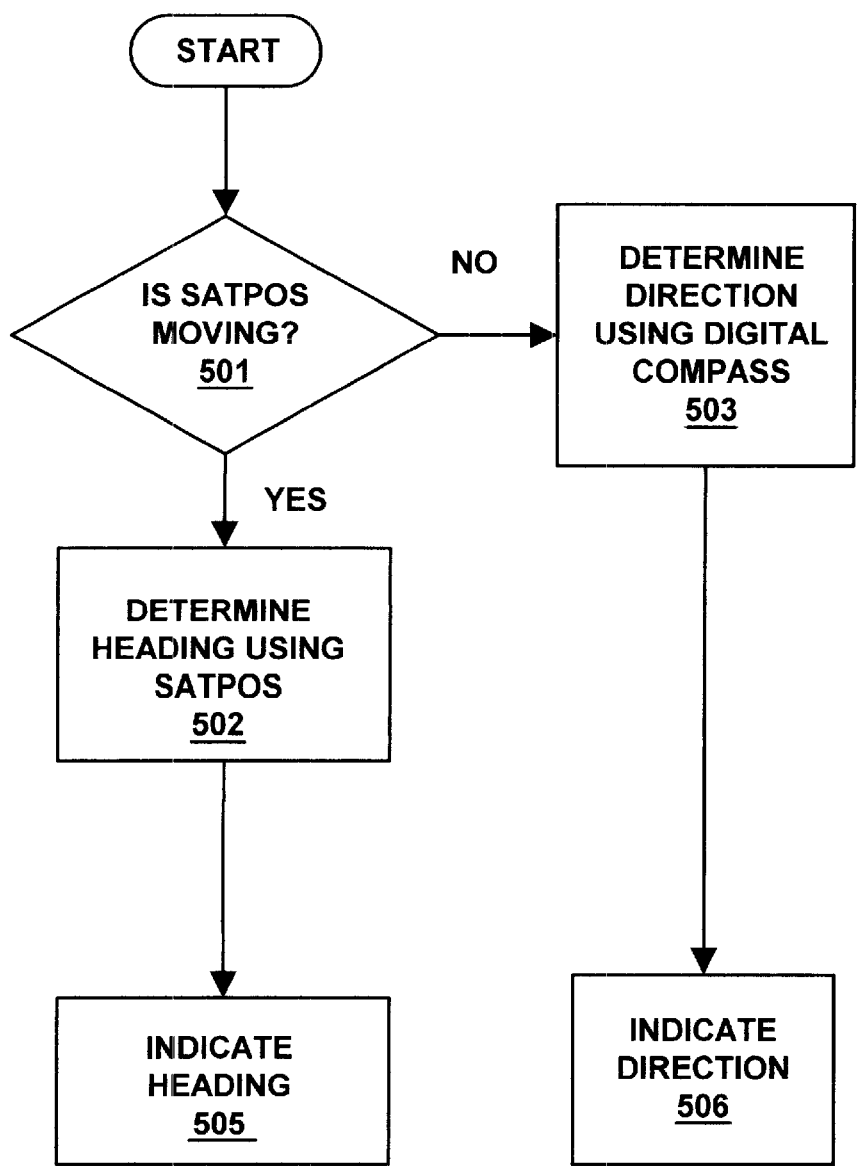
FIG. 5 is a flow chart illustrating a method for indicating direction and heading in accordance with one embodiment of the present invention.

FIG. 5 shows a method for indicating direction and heading according to one embodiment of the present invention. As shown by steps 501–502, when the SATPOS is moving, heading is determined using the SATPOS. In the present embodiment, a satellite positioning system including a receiver adapted to receive satellite position determining signals such as, for example, SATPOS 3 of FIGS. 1–4 is used to both determine whether the SATPOS is moving and to determine heading.

In one embodiment of the present invention, the determination of whether the SATPOS is moving (step 501) is made by comparing the velocity of movement to a threshold velocity. In the present embodiment, prior determinations of position are compared to the most recent determination of position, along with the time of each determination of position to determine the velocity of movement of the SATPOS. When the velocity is determined to be greater than the threshold velocity, the SATPOS is considered to be moving.

As shown by step 505 of FIG. 5, when the SATPOS is moving, heading is indicated using the heading determined in step 502. In the embodiment shown in FIG. 1, display device 2 is used to indicate heading; and in the embodiment shown in FIGS. 2–3, display device 28 is used to indicate heading.

Still referring to FIG. 5, when the SATPOS is not moving, as shown by steps 501 and 503, direction is determined using the digital compass. In the present embodiment, digital compass 4 of FIGS. 1–4 is used for determining direction.

As shown by step 506 of FIG. 5, when the SATPOS is not moving, direction is indicated using the direction determined by the digital compass in step 503. In the embodiment shown in FIG. 1, display device 2 is used to indicate direction; and in the embodiment shown in FIGS. 2–3, display device 28 is used to indicate direction.

The indications of direction and heading steps 505–506 can take any of a number of different forms. In one embodiment, heading and direction are indicated using a displayed compass rose. That is, icons representing a compass rose are displayed on, for example, display device 2 of FIG. 1 or display device 28 of FIGS. 2–3.

Figure 6A:
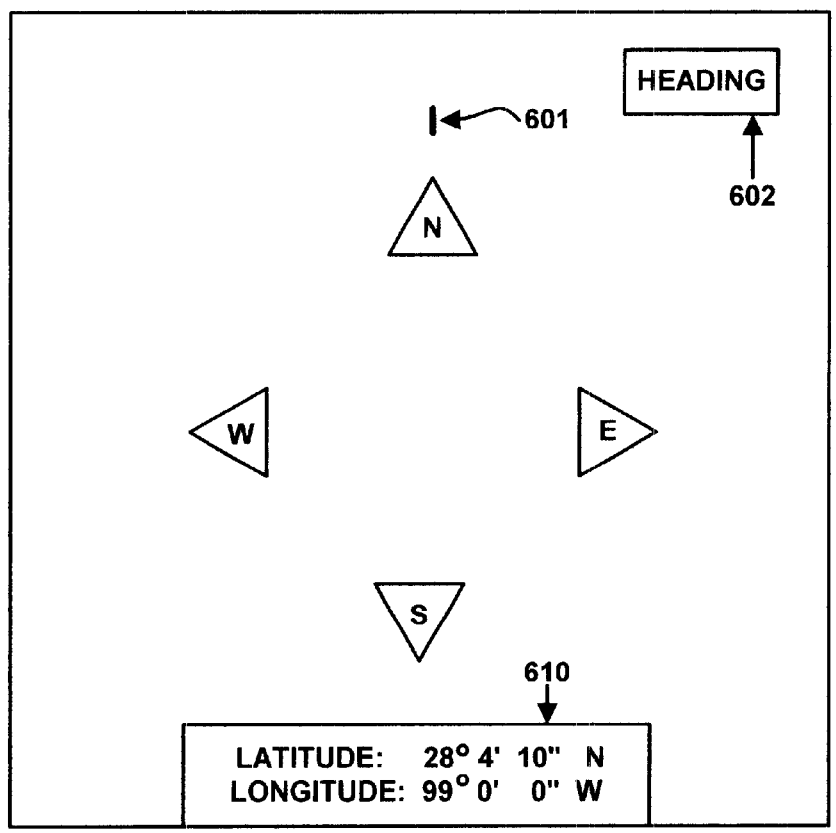
FIG. 6A is a diagram showing an exemplary display that indicates position and heading in accordance with one embodiment of the present invention.
Figure 6B:
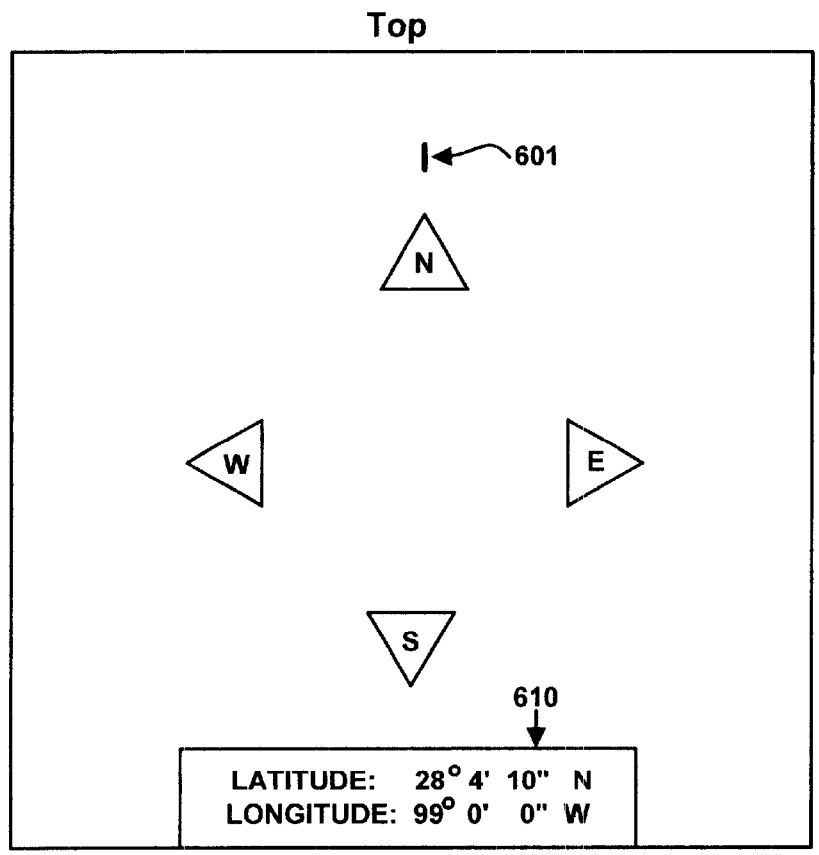
FIG. 6B is a diagram showing an exemplary display that indicates position and direction in accordance with one embodiment of the present invention.

In one embodiment of the present invention the direction and heading indicated in steps 505–506 are indicated using a four-point compass rose. That is, direction is indicated relative to the compass points of North (N), South (S), East (E), and West (W). FIGS. 6A–6B show exemplary displays 600a–600b that include a four-point compass rose that can be used to indicate either heading (step 505 of FIG. 5) or direction (step 506 of FIG. 5).

Referring now to FIGS. 6A–6B, in the present embodiment, an icon is used to indicate whether heading is being displayed or whether direction is being displayed. More particularly, in display 600a of FIG. 6A, icon 602 is displayed to indicate to the user that heading is being displayed. Referring now to FIG. 6B, display 600b indicates that direction is being displayed. That is, the absence of icon 602 of FIG. 6A indicates that the digital compass is being used and that direction is being displayed.

In the embodiments shown in FIGS. 6A–6B, the compass rose is displayed such that direction and heading are indicated relative to alignment mark 601. That is, the compass rose is rotated such that the proper direction or heading is always indicated by reference to alignment mark 601. Thus, in the embodiment shown in FIG. 6A, because the compass point of N is aligned with alignment mark 601, display 600a indicates that the SATPOS has a heading directly to the North. Similarly, in the embodiment shown in FIG. 6B, because the compass point of N is aligned with alignment mark 601, display 600b indicates a North direction. That is, the SATPOS is oriented such that alignment mark 601 is pointing directly to the North.

Figure 7A:
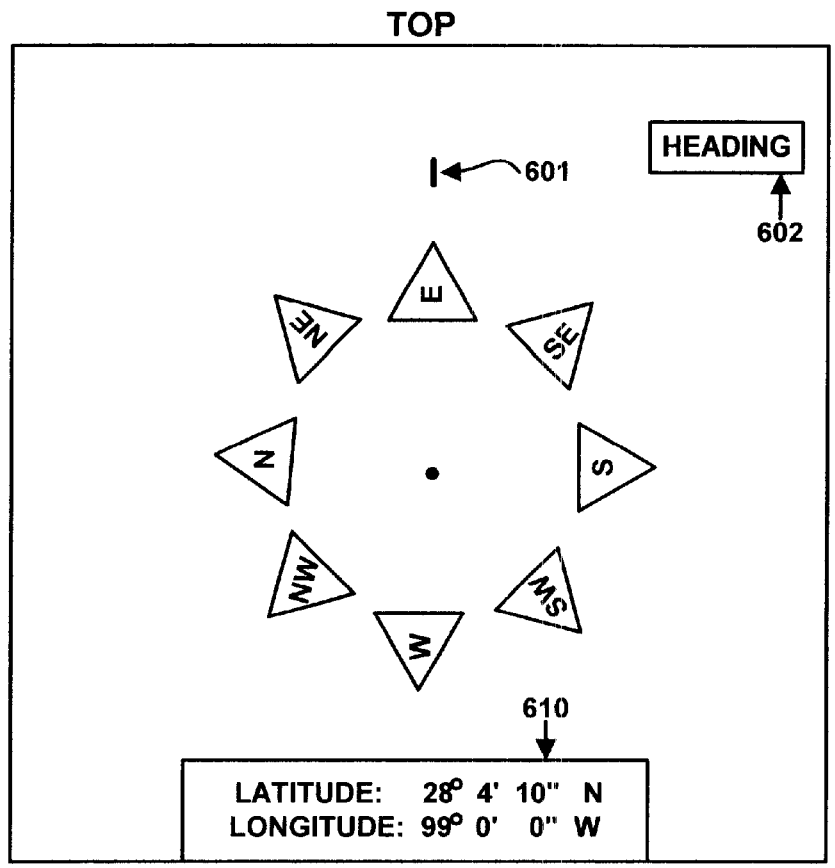
FIG. 7A is a diagram showing an exemplary display that indicates position and heading in accordance with one embodiment of the present invention.
Figure 7B:
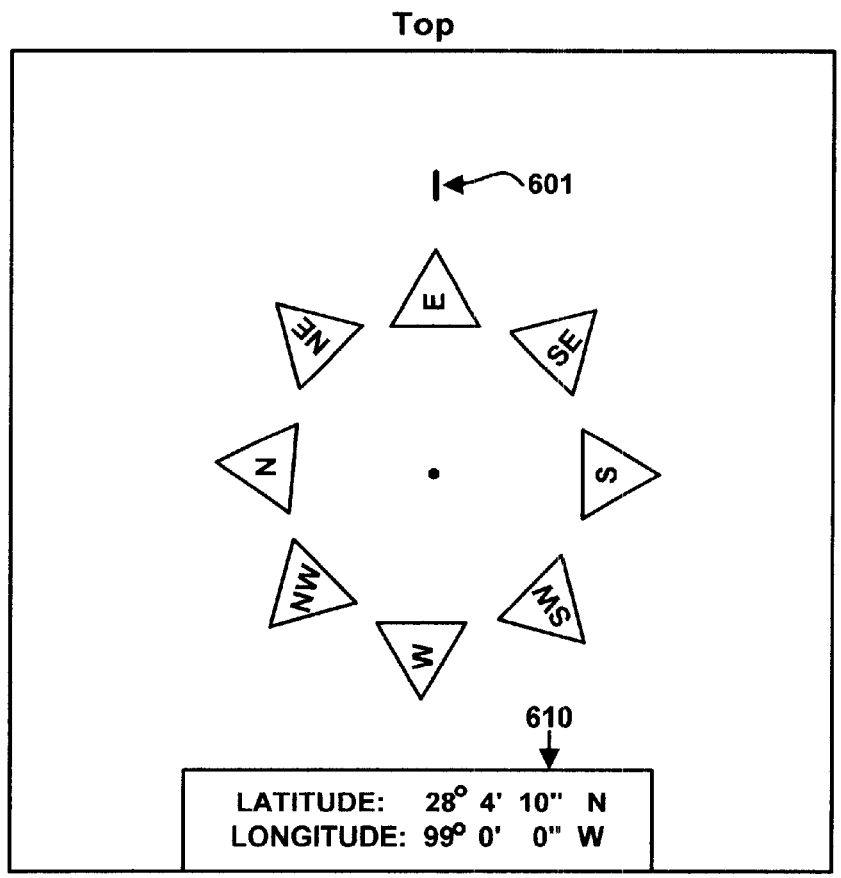
FIG. 7B is a diagram showing an exemplary display that indicates position and direction in accordance with one embodiment of the present invention.

FIGS. 7A–7B show an embodiment in which direction and heading are indicated using an eight-point compass rose. That is, direction and heading are indicated relative to the compass points of North (N), South (S), East (E), West (W), North East (NE), South East (SE), South West (SW), and North West (NW).

Referring now to FIGS. 7A–7B, exemplary displays 700a and 700b are shown to include an eight-point compass rose that can be used to indicate either heading (step 505 of FIG. 5) or direction (step 506 of FIG. 5). As in the embodiment shown in FIGS. 6A–6B, direction and heading are indicated relative to alignment mark 601 and icon 602 indicates whether direction or heading is being displayed.

In the embodiment shown in FIG. 7A, because the compass point of E is aligned with alignment mark 601, and because icon 602 is displayed, display 700a indicates that the SATPOS has a heading directly to the East. Similarly, in the embodiment shown in FIG. 7B, because the compass point of E is aligned with alignment mark 601, and because icon 602 is not displayed, display 700b indicates a East direction. That is, the SATPOS is oriented such that the top of the display, as indicated by alignment mark 601, is pointing directly to the East.

Figure 8A:
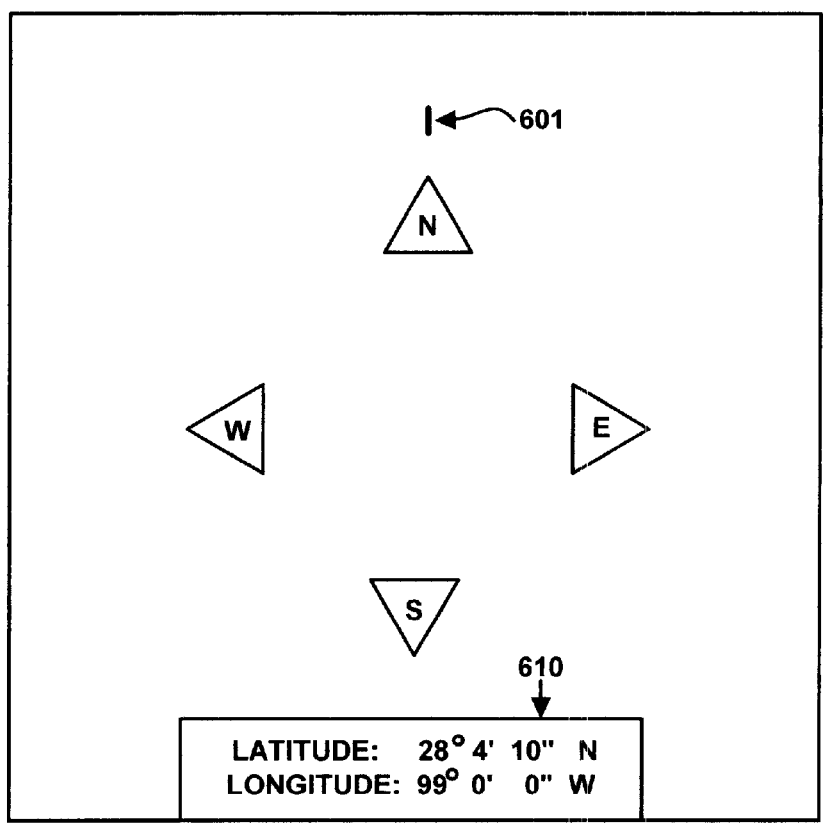
FIG. 8A is a diagram showing an exemplary display that indicates position and heading in accordance with one embodiment of the present invention.
Figure 8B:
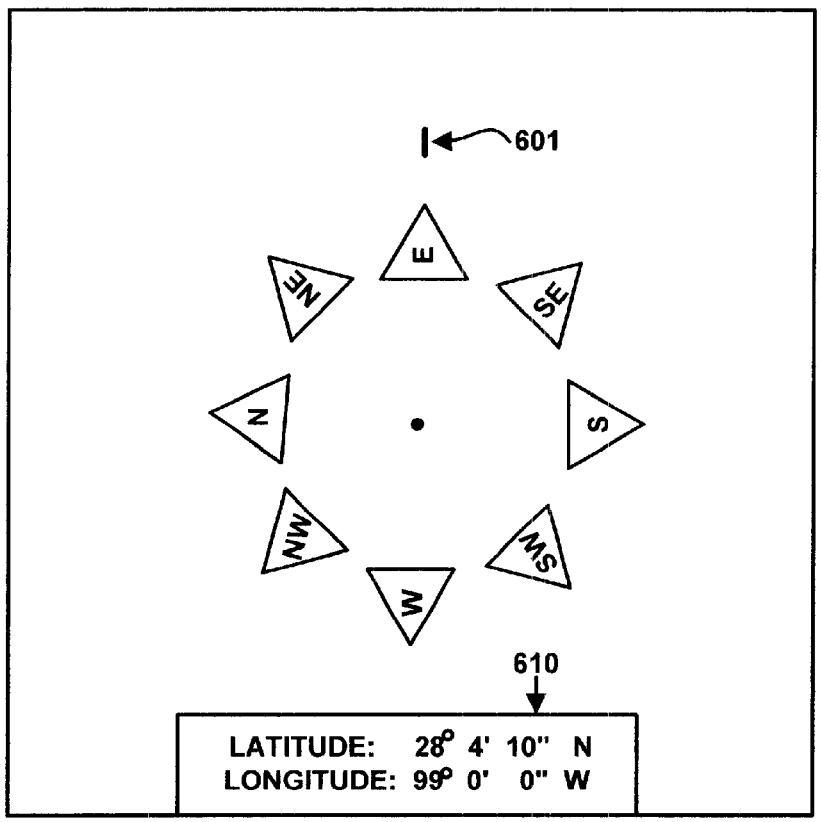
FIG. 8B is a diagram showing an exemplary display that indicates position and direction in accordance with one embodiment of the present invention.

FIGS. 8A–8B show an embodiment in which both a four-point compass rose and an eight-point compass rose are used. In the present embodiment, the display of a four-point compass rose indicates that heading (step 505 of FIG. 5) is being displayed while the display of an eight-point compass rose indicates that direction (step 506 of FIG. 5) is being displayed. In the embodiment shown in FIGS. 8A–8B, direction and heading are indicated relative to the top of the display, as indicated by alignment mark 601.

Now referring to display 800a of FIG. 8A, because the compass point of E is aligned with alignment mark 601, and because a four-point compass rose is displayed, display 800a indicates that the SATPOS has a heading directly to the East. Similarly, in the embodiment shown in FIG. 8B, because the compass point of E is aligned with alignment mark 601, and because an eight-point compass rose is displayed, display 800b indicates a East direction. That is, the SATPOS is oriented such that the top of the display, as indicated by alignment mark 601 is pointing in the cardinal direction of East.

The apparatus and method of the present invention automatically switches between displays of heading and direction as the SATPOS moves and stops moving. Thus, the method and apparatus of the present invention provide an uninterrupted display that can be used to find features, waypoints, etc. In the present embodiment, either heading or direction is continually displayed.

In the present embodiment, the determined position is also indicated. In the embodiments shown in FIGS. 6A–8B, position is indicated alphanumerically using latitude and longitude as shown by icon 610. Alternatively, position is indicated by an icon displayed on a moving map display.

Figure 9A:
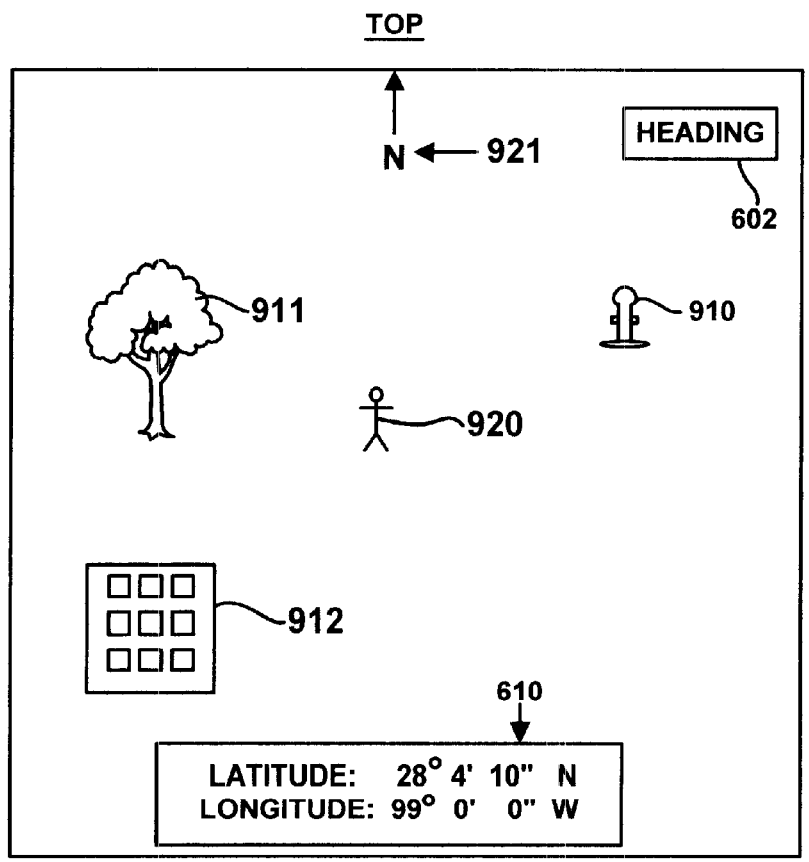
FIG. 9A is a diagram showing an exemplary display that indicates position and heading in accordance with one embodiment of the present invention.
Figure 9B:
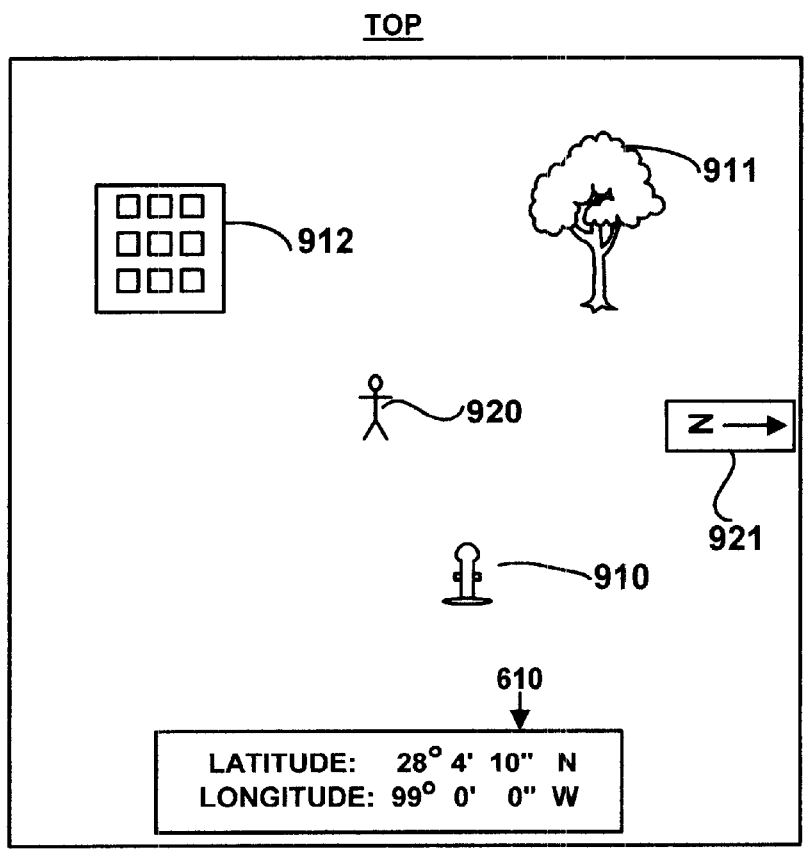
FIG. 9B is a diagram showing an exemplary display that indicates position and direction in accordance with one embodiment of the present invention.

In one embodiment of the present invention, position, direction and heading are indicated using a moving map display. FIGS. 9A–9B shows an exemplary display 900 that includes position icon 901 that indicates the position of the SATPOS relative to icons 910–912 that represent features. In the present embodiment, icon 910 indicates the position of a feature that is a fire hydrant, icon 911 indicates the position of a feature that is a tree, and icon 912 indicates the position of a feature that is a building.

Referring now to FIGS. 9A–9B, exemplary displays 900a and 900b are shown to include position icon 920 that indicates the position of the SATPOS relative to features 910–912. As in the embodiment shown in FIGS. 6A–7B, an icon 602 is displayed to indicate whether direction or heading is being displayed. In the present embodiment, an icon 921 that indicates the direction of North is also displayed so that the user can determine the orientation of the moving map display.

Referring now to FIG. 9A, an exemplary display 900a is shown that indicates a heading of North. That is, because heading icon 602 is displayed, a display of heading is indicated (step 505 of FIG. 5). Because the map is oriented such that the North icon is pointed to the top of the display, the heading is indicated as being directly to the North.

Referring now to FIG. 9B, an exemplary display 900b is shown that indicates a direction of West. That is, because heading icon 602 is not displayed, a display of direction is indicated (step 506 of FIG. 5). Because the map is oriented such that the North icon is pointed to the right side of the display, the direction is indicated as being directly to the West. That is, the display is oriented such that the top of the display points in the cardinal direction of West.

The apparatus and method of the present invention automatically switches between displays of heading and direction as the SATPOS moves and stops moving. Thus, the method and apparatus of the present invention provide an uninterrupted display that can be used to find features such as, for example, features 910–912 of displays 900a–900b.

The present invention is well adapted for other indications of heading and direction other than those shown in FIGS. 6A–9B. In one embodiment, heading and/or direction are indicated using an indication of degrees from 0 to 360 degrees. That is, a number is displayed on the display device that indicates cardinal direction with 0 and 360 being North. That is, in the embodiment shown in FIG. 1, display device 2 displays a number from 0 to 360; and in the embodiment shown in FIGS. 2–3, display device 28 displays a number from 0 to 360.

The embodiments shown in FIGS. 1–9B of the present invention provide a method and apparatus for providing an accurate indication of direction and heading to a user of a SATPOS device. When the user is stationary, position is accurately indicated using a digital compass. When the user is moving, the direction of movement (heading) is accurately indicated. Because the integrated position and direction system of the present invention always indicates either heading or direction, the user is always able to locate features, waypoints, etc.

Prior art digital compasses are typically calibrated manually by rotating the digital compass in a circular arc. The digital compass of the present invention can be manually calibrated using this technique.

In one embodiment of the present invention, the digital compass is automatically calibrated using the SATPOS determination of heading. In one embodiment of the present invention, the digital compass is automatically calibrated upon selection of an icon or button that indicates "Automatic Compass Calibration" when the position and direction system of the present invention is moving (e.g., when step 501 of FIG. 5 indicates that the SATPOS is moving).

In one embodiment of the present invention, the digital compass is automatically calibrated on a periodic basis, without any required input from the operator, when the SATPOS is moving. In one embodiment, the digital compass is automatically calibrated according to user selectable time periods. In the present embodiment, the user can select time periods of ten minutes, 30 minutes, one hour, four hours, or 12 hours. Thus, for example, when a user selects a time period of ten minutes, the digital compass is calibrated when the digital compass begins to move and every ten minutes thereafter until the digital compass stops moving. This provides for easily maintaining the accuracy of the digital compass.

In the present embodiment, the digital compass is calibrated by determining heading using the SATPOS, and adjusting the direction indicated by the digital compass according to the heading determined by the satellite positioning system. In the embodiment shown in FIG. 1, controller 1 is operable to automatically calibrate the digital compass; in the embodiment shown in FIGS. 2–3, direction program 22 is operable to automatically calibrate the digital compass; and in the embodiment shown in FIG. 4, direction program 42 is operable to automatically calibrate the digital compass.

Figure 10:
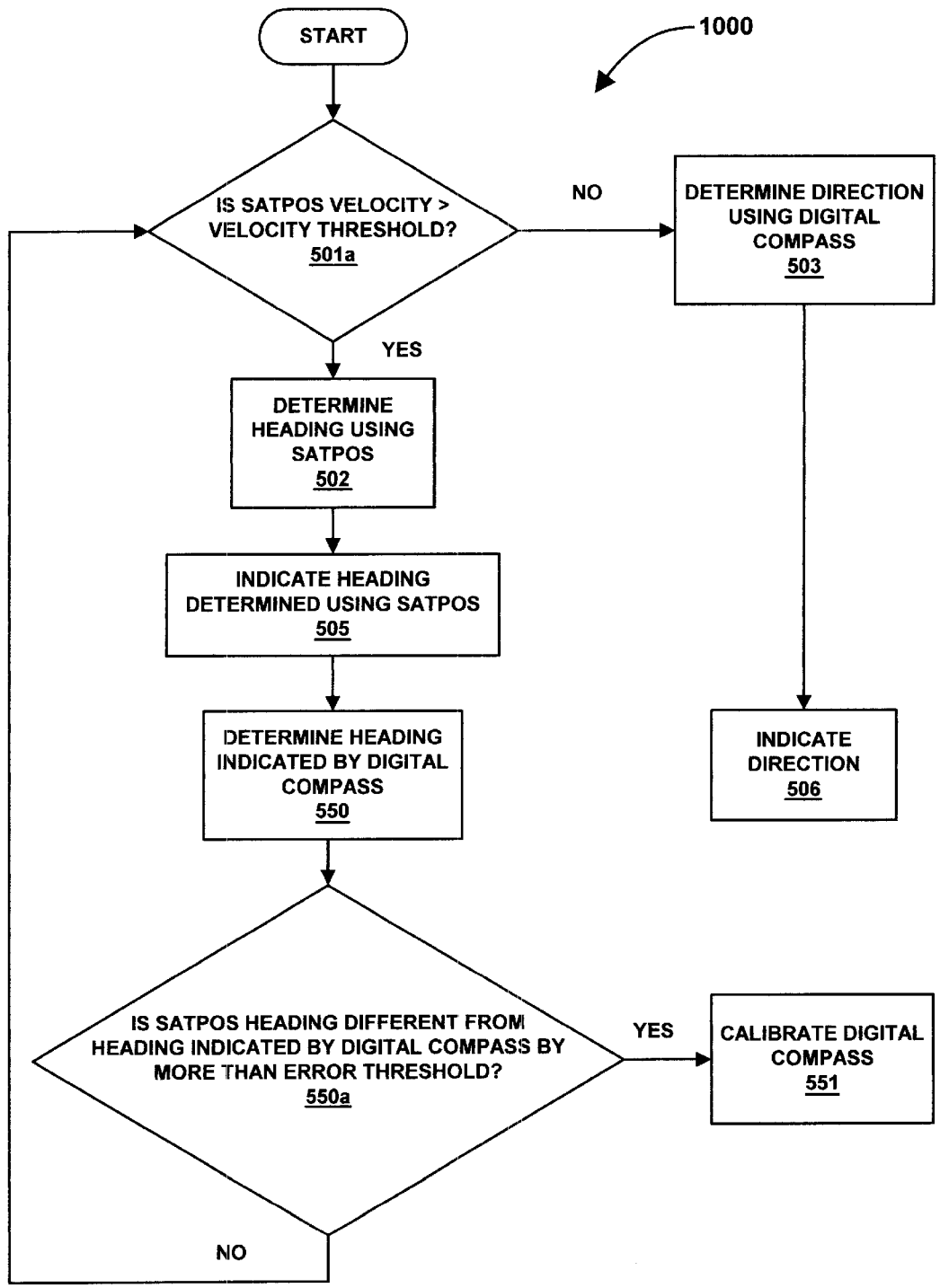
FIG. 10 is a flowchart illustrating a method for calibrating a digital compass in accordance with one embodiment of the present invention.

FIG. 10 shows a method for calibrating a digital compass 1000 in which a digital compass (e.g., digital compass 4 of FIGS. 1–4) is calibrated using a heading determined using a SATPOS (e.g., SATPOS 3 of FIGS. 1–4). Referring now to step 501a, the velocity determined by the SATPOS is compared to a threshold velocity. If the velocity is not greater than the threshold velocity (steps 501a and 503), direction is determined using the digital compass(step 503), and direction is indicated as shown by step 506.

Continuing with FIG. 10, if the velocity is not greater than the threshold velocity, heading is determined using the SATPOS as shown by steps 501a and 502. The heading determined using the SATPOS is then indicated as shown by step 505.

Still referring to FIG. 10, as shown by step 550, the heading indicated by the digital compass is determined. In the embodiment shown in FIG. 1, controller 1 is operable to determine the heading indicated by the digital compass using input from digital compass 4; in the embodiment shown in FIGS. 2–3, direction program 22 is operable to determine the heading indicated by the digital compass; and in the embodiment shown in FIG. 4, direction program 42 is operable to determine the heading indicated by the digital compass.

The heading indicated by the digital compass is then compared to the heading determined using the SATPOS as shown by step 550a. If the difference between the heading determined using the SATPOS and the heading indicated by the digital compass is more than a predetermined error threshold, the digital compass is calibrated as shown by step 551. In one embodiment, a default error threshold of between one to two percent is initially used, which can be altered by the user at any time to accommodate the needs of that particular user. The present embodiment allows for the automatic calibration of the digital compass whenever the heading indicated by the digital compass significantly varies from the heading determined using the SATPOS.

As discussed above, the present invention provides for automatically calibrating a digital compass, either as a result of user input (e.g., selection of an icon, pressing of a button, etc.), or as a result of user-defined criteria for automatic calibration. That is, the user can program the present invention to automatically calibrate the digital compass (e.g., when velocity exceeds a given threshold, whenever the SATPOS begins moving, periodically while the SATPOS is moving, when the difference between the SATPOS determined heading differs from the heading indicated by the digital compass by more than a predetermined threshold, etc.). The integrated position and direction system of the present invention is easy to use since there in no need for a user to manually calibrate the digital compass.

Though the embodiments shown in FIGS. 1–9B describe the indication of either direction or heading, the present invention is well adapted for display of both direction and heading when the SATPOS is moving.

Method for Determining Drift

Figure 12:
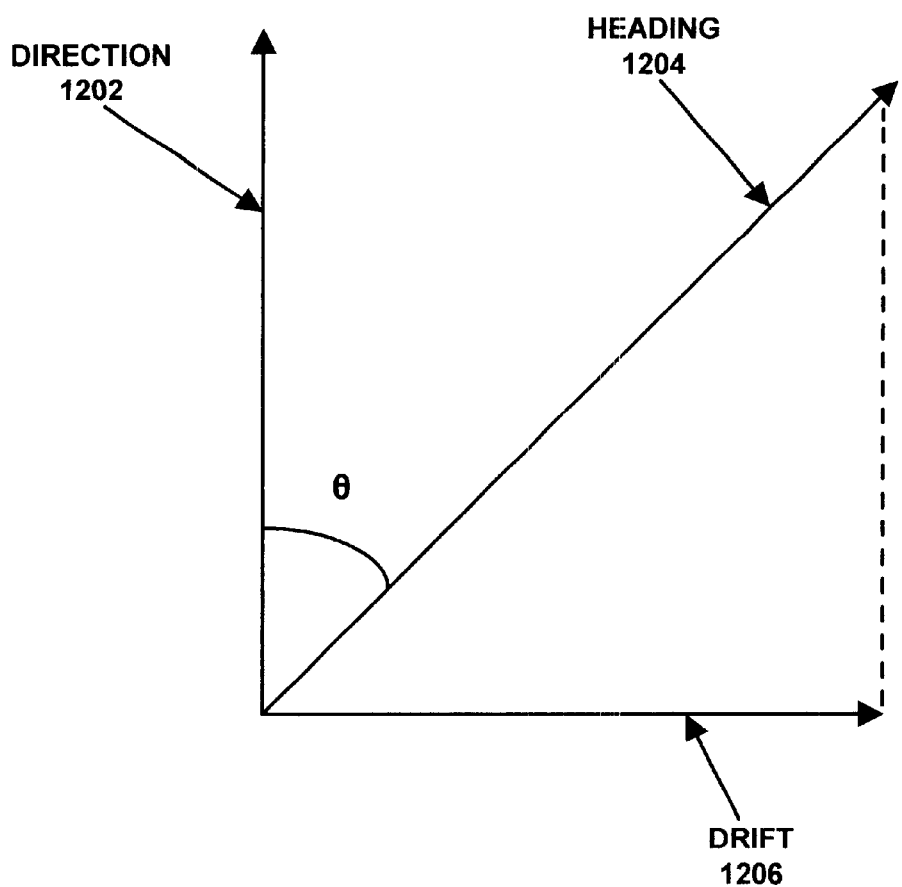
FIG. 12 illustrates direction, heading and drift in accordance with one embodiment of the present invention.

FIG. 12 illustrates the use of the terms "direction," "heading" and "drift" in accordance with one embodiment of the present invention. A craft (such as a boat, airplane, and the like) intends to travel along a course indicated by the direction vector 1202. Without the influence of factors that could cause the craft to drift (e.g., current, wind, tide, etc.), the craft could accurately follow the course indicated by direction vector 1202 using digital compass 4. With drift, the craft will actually follow a course indicated by the heading vector 1204.

Direction vector 1202 is the direction indicated by a digital compass (e.g., digital compass 4 of FIGS. 1, 2 and 4). Heading vector 1204 is determined by SATPOS 3 of FIGS. 1, 2 and 4. The craft's position on either direction vector 1202 or heading vector 1204 can be accurately determined using SATPOS 3.

The deviation between direction vector 1202 and heading vector 1204 is measured by the angle θ. In accordance with the present embodiment of the present invention, the angle θ can be determined from the direction vector 1202 and the heading vector 1204. In this embodiment, the position information and the angle θ can then be used to determine the amount of drift (e.g., the magnitude of drift vector 1206). When the amount of drift is known, a new course can be determined to compensate for drift, allowing the craft to reach its intended destination.

For example, consider the case in which a craft is intended to travel due North; in this case, direction vector 1202 corresponds to due North. In actuality, because of drift, the craft is moving in a Northeast direction and is positioned along heading vector 1204. The angle θ corresponds to the difference between the direction determined using digital compass 4 and the heading determined using SATPOS 3. If, for example, digital compass 4 indicates a direction of 0 degrees and SATPOS 3 indicates a heading of 45 degrees, the angle θ is the difference, or 45 degrees. It will be apparent to one skilled in the art that the angle θ can be similarly determined when the heading is of a value smaller than the value of the direction. It is also appreciated that the angle θ can be determined using units other than degrees.

In one embodiment, once the angle θ is known, geometric or trigonometric relationships can be used to determine the magnitude of drift vector 1206. For example, the magnitude of drift vector 1206 is equal to the magnitude of heading vector 1204 multiplied by the sine of θ. The magnitude of heading vector 1204 is accurately determined using the position information from SATPOS 3.

Figure 13:
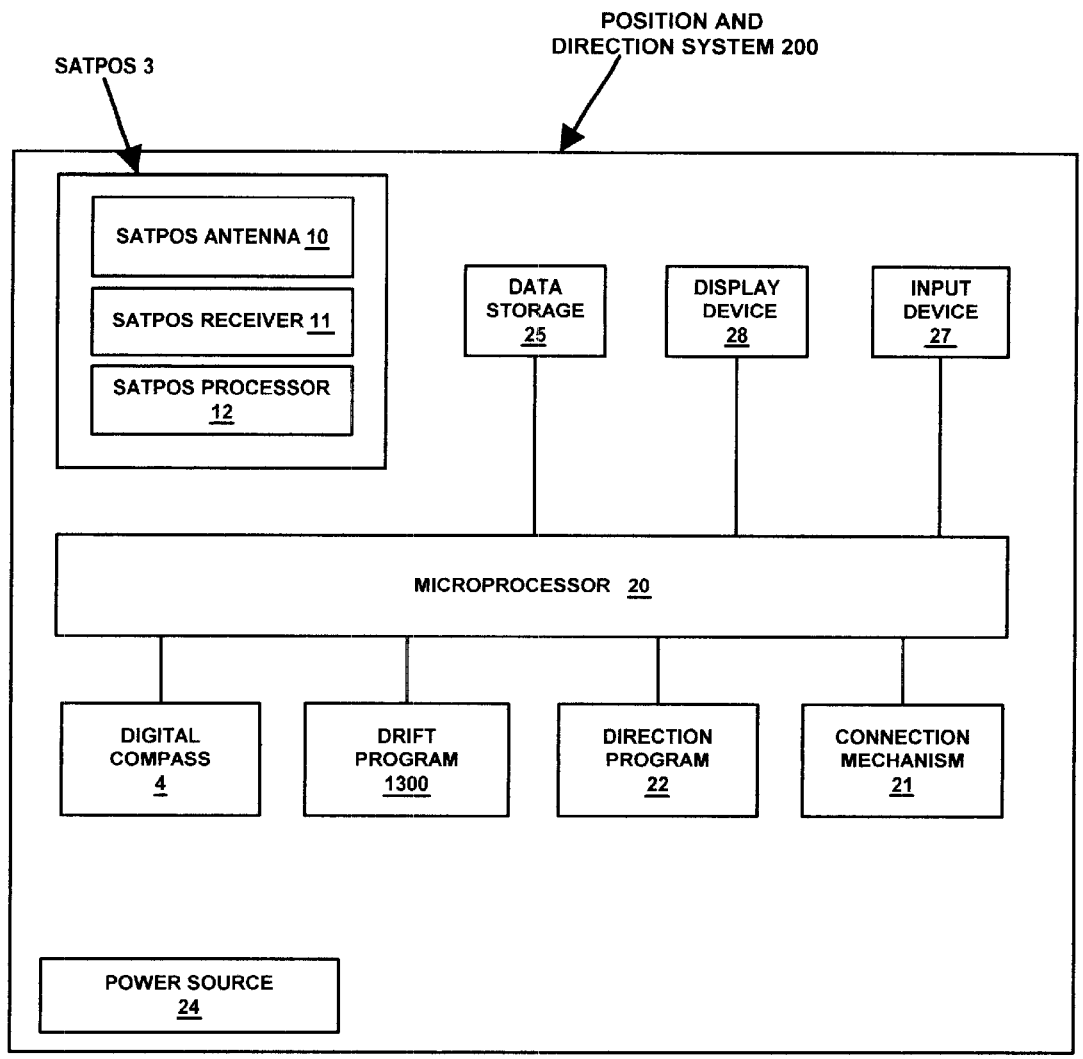
FIG. 13 is a block diagram of an integrated position and direction system for determining drift in accordance with one embodiment of the present invention.

FIG. 13 is a block diagram of an integrated position and direction system 200 for determining drift in accordance with one embodiment of the present invention. In accordance with the present embodiment of the present invention, a drift program 1300 is added to integrated position and direction system 200. Details with regard to the other features of the embodiment of FIG. 13 were provided above in conjunction with FIG. 2.

In one embodiment, drift program 1300 is a software program for determining the amount of drift 1206 (FIG. 12). That is, drift program 1300 implements the method for calculating drift exemplified by the discussion provided in conjunction with FIG. 12 above. In this embodiment, drift program 1300 is executed by a controller such as microprocessor 20. It is appreciated that, in other embodiments, the method for calculating drift can instead be implemented in hardware or firmware or integrated with direction program 22.

Figure 14:
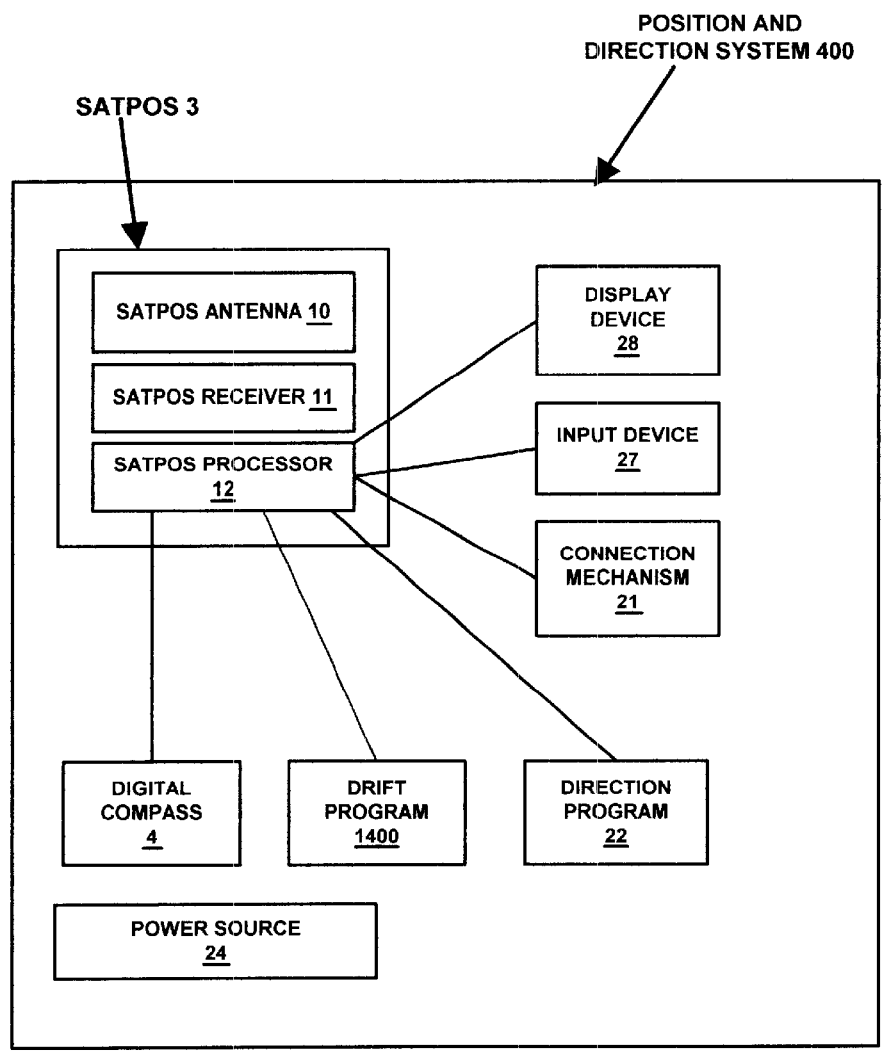
FIG. 14 is a block diagram of an integrated position and direction system for determining drift in accordance with another embodiment of the present invention.

FIG. 14 is a block diagram of an integrated position and direction system 400 for determining drift in accordance with another embodiment of the present invention. In accordance with the present embodiment of the present invention, a drift program 1400 is added to integrated position and direction system 400. Details with regard to the other features of the embodiment of FIG. 14 were provided above in conjunction with FIG. 4.

In one embodiment, drift program 1400 is a software program for determining the amount of drift 1206 (FIG. 12). That is, drift program 1400 implements the method for calculating drift exemplified by the discussion provided in conjunction with FIG. 12 above. In this embodiment, drift program 1300 is executed by a controller such as SATPOS processor 12. It is appreciated that, in other embodiments, the method for calculating drift can instead be implemented in hardware or firmware or integrated with direction program 22.

Figure 15:
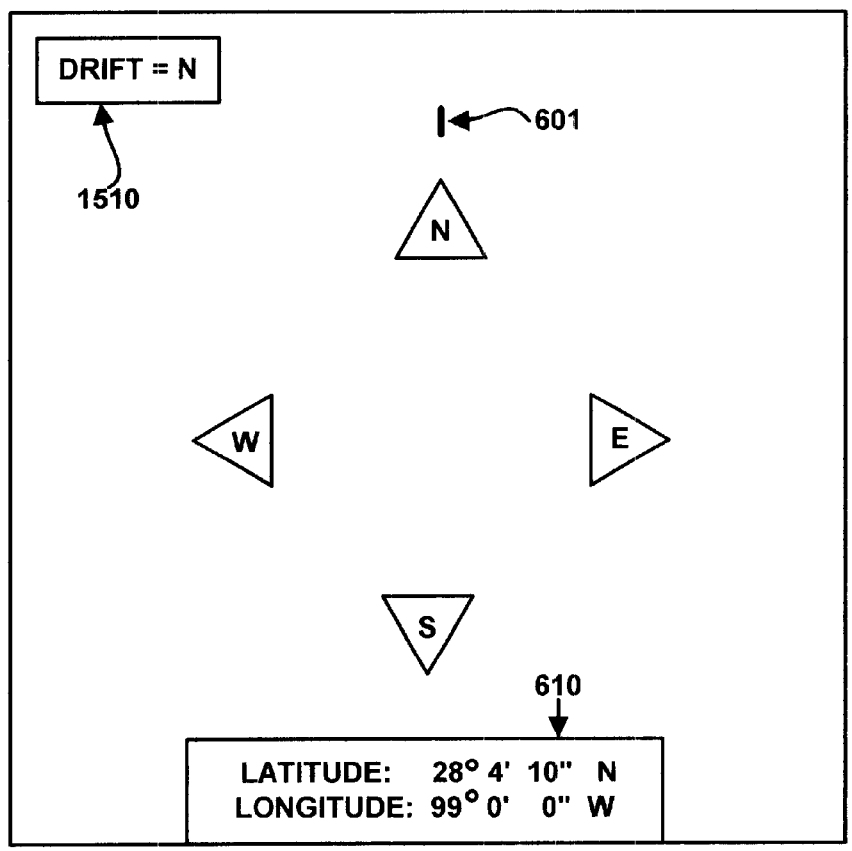
FIG. 15 is a diagram showing an exemplary display that indicates drift in accordance with one embodiment of the present invention.

FIG. 15 is a diagram showing an exemplary display 1500 for indicating drift in accordance with one embodiment of the present invention. In the present embodiment, an icon 1510 is used to indicate that drift is being displayed on display device 28 (FIGS. 13 and 14). As described above, icons are similarly used to indicate whether heading or direction is being displayed on display device 28. In one embodiment, icon 1510 is also used to indicate an amount of drift N; however, it is appreciated that the amount of drift may be indicated elsewhere in display 1500. It is also appreciated that, instead of a visual display, other means of indicating drift to a user may be used, such as an audible indication.

Continuing with reference to FIG. 15, display 1500 shows an embodiment in which a four-point compass rose is used; however, it is appreciated that eight-point compass roses may also be used as described above in conjunction with FIGS. 6A–B, 7A–B and 8A–B. In the present embodiment, the compass rose is oriented (rotated) such that the direction of drift is indicated relative to alignment mark 601.

In one embodiment, the amount of drift is graphically displayed to the user in the manner shown by FIG. 12. That is, the direction vector 1202, heading vector 1204 and drift vector 1206 are displayed to the user.

Figure 16:
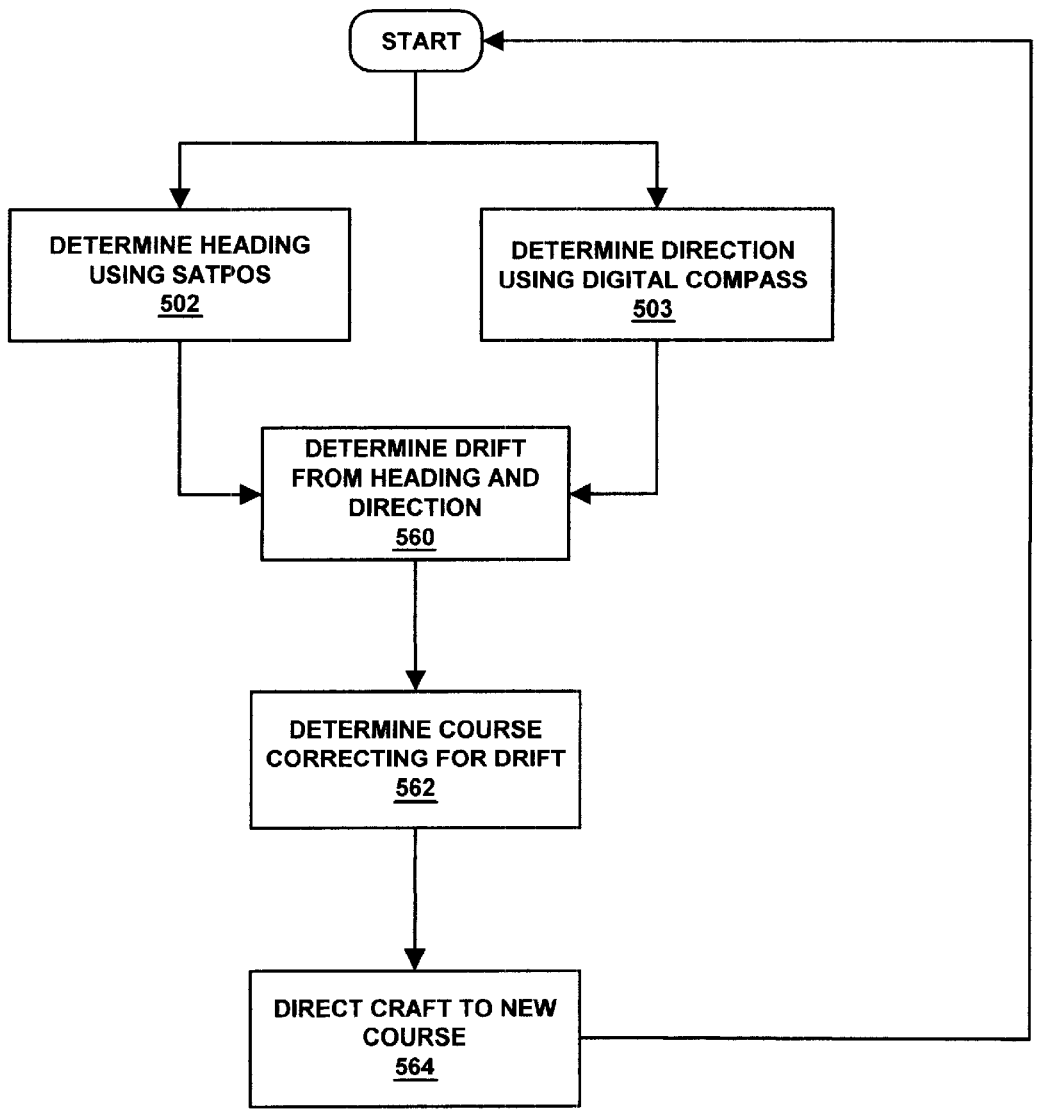
FIG. 16 is a flowchart of the steps in a process for determining drift in accordance with one embodiment of the present invention.

FIG. 16 is a flowchart of the steps in a process 1600 for determining. drift in accordance with one embodiment of the present invention. Process 1600 can be implemented in software, hardware or firmware. In the present embodiment, process 1600 is implemented using drift programs 1300 and 1400 of FIGS. 13 and 14, respectively. In accordance with the present invention, all or some of the steps of process 1600 can be executed automatically without user intervention.

In step 502 of FIG. 16, heading vector 1204 (FIG. 12) is determined using SATPOS 3 (FIGS. 13 and 14) as previously described herein. In step 503, direction vector 1202 (FIG. 12) is determined using digital compass 4 (FIGS. 13 and 14).

In step 560 of FIG. 16, the heading and direction information are used to determine the magnitude and direction of drift. As described in conjunction with FIG. 12, the difference between the heading and direction information can be used to determine the direction of the drift measured by the angle θ. The position information from SATPOS 3 can then be used with the angle θ to determine the amount of drift.

In step 562 of FIG. 16, a course can be determined that compensates for drift and that would bring a craft to a course that would allow it to reach its intended destination.

In step 564 of FIG. 16, the craft can be brought to the course determined in step 562.

In one embodiment, integrated position and direction system 200 or 400 (FIGS. 13 and 14, respectively) can be coupled to a navigation control system that is used for controlling crafts (e.g., an "automatic pilot"). Accordingly, the amount of drift (including direction) can be automatically determined using integrated position and direction systems 200 and 400, and fed to the navigation control system. The navigation control system can automatically determine a course compensating for the drift, and steer the craft accordingly.

With or without a navigation control system, integrated position and direction systems 200 and 400 provide a system and method that can provide (either automatically or otherwise) a relatively continuous measurement of the amount of drift (including the direction of drift) to a user. As such, the user (e.g., a driver of a boat, a plane's pilot or auto pilot, etc.) can make multiple, relatively minor adjustments along the way to compensate for the drift, instead of, for example, traveling a long distance and then making a more significant adjustment for drift. Thus, in accordance with the present invention, the craft will follow a more direct course to its intended destination, and thereby will reach its destination more quickly and efficiently.

In summary, the present invention provides a method and apparatus that accurately indicate direction and heading to a user of a integrated position and direction system. The present invention also provides a method and system for determining drift using the direction and heading information. The amount of drift and the direction of drift can be clearly displayed to the user, so that the information can be readily understood (without confusion) and used. The present invention can be used to determine drift on a regular (relatively continuous) basis, thereby accounting for any changes in the amount of drift. In addition, the present invention removes from the user the burden of having to perform frequent drift calculations, and thus is convenient and user-friendly.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated position and direction system comprising:

a digital compass adapted to determine direction;

a satellite positioning system coupled to said digital compass, said satellite positioning system comprising:

a receiver adapted to receive satellite position determining signals; and a controller coupled to said receiver, said controller for determining position and for determining heading;

wherein said satellite positioning system is adapted to determine an amount of drift using said heading and said direction and to determine a direction of drift using said heading and said direction; and a display coupled to said satellite positioning system, said display for indicating said amount of drift and said direction of drift.

2. The integrated position and direction system of claim 1 wherein said display is also for indicating said heading and said direction.

3. The integrated position and direction system of claim 1 wherein said satellite positioning system is coupled to a navigation control system for a craft, wherein said navigation control system uses said amount of drift to determine a compensating course for said craft.

4. The integrated position and direction system of claim 1 further comprising:

a housing, wherein said satellite positioning system and said digital compass are disposed within said housing.

5. An integrated position and direction system comprising:
   a satellite positioning system adapted to receive satellite position determining signals, said satellite positioning system also adapted to determine position and heading;
   a digital compass coupled to said satellite position system, said digital compass adapted to determine direction; and
   a controller coupled to said satellite positioning system and said digital compass, said controller for controlling the operations of said integrated position and direction system and said digital compass, wherein said controller is adapted to determine a direction of drift using said heading and said direction;
   wherein said controller is also adapted to determine an amount of drift using said heading and said direction; and
   a display coupled to said controller, said display for indicating said amount of drift and said direction of drift.

6. The integrated position and direction system of claim 5 wherein said display is also for indicating said direction and said heading.

7. The integrated position and direction system of claim 5 wherein said controller is coupled to a navigation control system for a craft, wherein said navigation control system uses said amount of drift to determine a compensating course for said craft.

8. The integrated position and direction system of claim 5 further comprising:
   a housing, wherein said satellite positioning system, said controller and said digital compass are disposed within said housing.

9. A method of navigation using an integrated position and direction system, said method comprising:
   a) determining heading using a satellite positioning system;
   b) determining direction using a digital compass;
   c) determining drift using said heading and said direction; and
   d) displaying an amount of drift and a direction of drift on a display device.

10. The method as recited in claim 9 wherein said step d) further comprises the step of:
    indicating said heading using said display device.

11. The method as recited in claim 9 wherein said step d) further comprises the step of:
    indicating said direction using said display device.

12. The method as recited in claim 9 further comprising the step of:
    determining a course compensating for said drift.

13. The method as recited in claim 9 further comprising the step of:
    calibrating said digital compass using said heading.

14. A method of automatic navigation using an integrated position and direction system coupled to a navigation control system, said method comprising:
    a) determining heading of a craft using a satellite positioning system of said integrated position and direction system;
    b) determining direction of said craft using a digital compass of said integrated position and direction system;
    c) determining drift of said craft using said heading and said direction;
    d) determining a course compensating for said drift;
    e) directing said craft to follow said course using said navigation control system; and
    displaying an amount of drift and a direction of drift.

15. The method as recited in claim 14 further comprising the step of:
    displaying said direction.

16. The method as recited in claim 14 further comprising the step of:
    displaying said heading.

* * * * *